United States Patent [19]

Carome

[11] Patent Number: 4,799,752

[45] Date of Patent: Jan. 24, 1989

[54] FIBER OPTIC GRADIENT HYDROPHONE AND METHOD OF USING SAME

[75] Inventor: Edward F. Carome, Cleveland, Ohio

[73] Assignee: Litton Systems, Inc., Beverly Hills, Calif.

[21] Appl. No.: 99,199

[22] Filed: Sep. 21, 1987

[51] Int. Cl.⁴ .......................... G02B 6/26; G01D 5/34; G01B 9/02; H04R 17/00

[52] U.S. Cl. ............................. 350/96.15; 350/96.29; 350/320; 250/227; 250/231 P; 356/345; 356/349; 367/149; 367/165; 367/166; 73/655; 73/657

[58] Field of Search .............. 350/96.10, 96.15, 96.16, 350/96.29, 96.30, 320; 250/227, 231 P; 356/345, 349, 351; 367/141, 142, 149, 153, 159, 160, 165, 166, 167; 73/655, 657

[56] References Cited

U.S. PATENT DOCUMENTS

| | | | |
|---|---|---|---|
| 3,645,603 | 2/1972 | Smith | 350/149 |
| 3,990,036 | 11/1976 | Savit | 340/15.5 TS |
| 4,162,397 | 7/1979 | Bucaro et al. | 350/96.29 |
| 4,166,946 | 9/1979 | Chown et al. | 250/199 |
| 4,294,513 | 10/1981 | Nelson et al. | 350/96.29 |
| 4,301,543 | 11/1981 | Palmer | 455/612 |
| 4,307,933 | 12/1981 | Palmer et al. | 350/96.16 |
| 4,307,937 | 12/1981 | Gordon | 350/96.29 |
| 4,322,829 | 3/1982 | Davis, Jr. et al. | 350/96.29 X |
| 4,360,272 | 11/1982 | Schmadel et al. | 356/352 |
| 4,368,981 | 1/1983 | Ozeki | 352/349 X |
| 4,378,143 | 3/1983 | Winzer | 350/96.15 |
| 4,442,350 | 4/1984 | Rashleigh | 250/227 |
| 4,443,700 | 4/1984 | Macedo et al. | 250/227 |
| 4,490,163 | 12/1984 | Jochem et al. | 65/4.21 |
| 4,493,528 | 1/1985 | Shaw et al. | 350/96.15 |
| 4,505,587 | 3/1985 | Haus et al. | 356/345 |
| 4,525,818 | 6/1985 | Cielo et al. | 367/149 |
| 4,530,603 | 7/1985 | Shaw et al. | 356/345 |
| 4,534,222 | 8/1985 | Finch et al. | 73/653 |
| 4,545,253 | 10/1986 | Avicola | 73/655 |
| 4,547,869 | 10/1985 | Savit | 367/149 |
| 4,552,457 | 11/1985 | Giallorenzi | 345/349 X |
| 4,570,248 | 2/1986 | Assard | 367/149 |
| 4,588,255 | 5/1986 | Tur et al. | 350/96.16 |
| 4,588,296 | 5/1986 | Cahill et al. | 356/350 |
| 4,593,385 | 6/1986 | Chamuel | 367/149 |
| 4,606,020 | 8/1986 | Ruffin | 370/3 |
| 4,630,885 | 12/1986 | Haavisto | 350/96.15 |
| 4,632,551 | 12/1986 | Pavlath | 356/345 |
| 4,633,170 | 12/1986 | Burns | 324/77 K |
| 4,648,082 | 3/1987 | Savit | 367/149 |
| 4,648,083 | 3/1987 | Giallorenzi | 367/149 |
| 4,653,916 | 3/1987 | Henning et al. | 356/345 |
| 4,671,113 | 6/1987 | Carome | 250/227 X |
| 4,676,583 | 6/1987 | Hicks, Jr. | 350/96.15 |
| 4,676,585 | 6/1987 | Shaw et al. | 350/96.15 |
| 4,697,876 | 10/1987 | Dyott | 350/96.29 |
| 4,697,926 | 10/1987 | Youngquist et al. | 356/345 |

FOREIGN PATENT DOCUMENTS

| | | | |
|---|---|---|---|
| 0023345 | 2/1981 | European Pat. Off. | 250/227 X |
| 3224775 | 1/1983 | Fed. Rep. of Germany | 350/96.16 X |
| 2473188 | 7/1981 | France | 350/96.16 X |
| 58-211119 | 12/1983 | Japan | 350/96.16 X |
| WO79/00377 | 6/1979 | PCT Int'l Appl. | 250/227 X |
| WO83/03684 | 4/1982 | PCT Int'l Appl. | 356/350 X |
| WO83/02496 | 1/1983 | PCT Int'l Appl. | 356/350 X |
| WO85/00221 | 6/1983 | PCT Int'l Appl. | 356/350 X |
| 83/01303 | 4/1985 | PCT Int'l Appl. | 356/350 |
| 2096762 | 10/1982 | United Kingdom | 250/227 X |

OTHER PUBLICATIONS

Davis, "Fiber Optic Sensors: an Overview", Pro. of SPIE, Fiber Optic and Laser Sensors II, 5/84, Arl. VA., vol. 478, pp. 12–18.

Jarzynski et al., "Frequency Response of Interferometric... Hydrophones", J. Acoust. Soc. Am., vol. 69, No. 6, 6/81, pp. 1799–1808.

Davis, "An Introduction to Fiber Optic Sensors", Laser Focus/Fiber Optic Tech., vol. 18, No. 2, 2/82, pp. 112–118.

Sheem et al., "Wavelength Monitoring of Single-Mode Diode Laser Using Guided Wave Interferometer", *Optics Letters,* May. 1980, vol. 5, No. 5, pp. 179–181.

Pavlath, "Applications of All Fiber Technology to Sensors", *Proc. SPIE,* (Int. Soc. Opt. Eng.), vol. 412, 5–7, Apr. 1983, pp. 70–79.

Giallorenzi et al., "Optical Fiber Sensor Technology", *IEEE Transactions on Microwave Theory and Techniques,* vol. MTT-30, No. 4, Apr. 1982, pp. 472–511.

Dandridge et al., "Homodyne Demodulation Scheme for Fiber Optic Sensors Using Phase Generated Carrier.", *IEEE Journal of Quantum Electronics*, vol. QE-18, No. 10, Oct. 1982, pp. 1647-1653.

Kersey et al., "Demodulating Scheme Fibre Interometric Sensors Employing Laser Frequency Switching", *Electronics Letters*, vol. 19, No. 3, pp. 102-103, (2/13/83).

Nelson et al., "Passive Multiplexing Systems for Fiber Optic Sensors", *Applied Optics*, vol. 19, No. 17, 9/1980, pp. 2917-2920.

Nelson et al., "Passive Multiplexing Techniques for Fiber Optics Sensor Systems", *I.F.O.C.*, 3/1981, pp. 27-30.

Bergh, et al., "Single-Mode Fibre Optic Dirctional Coupler", Mar. 27, 1980, *Electronics Letters*, vol. 16, No. 7, pp. 260-261.

Brooks et al., "Coherence Multiplexing of Fiber-Optic Interferometric Sensors", *Journal of Lightwave Technology*, vol. LT-3, No. 5, Oct. 1985, pp. 1062-1071.

Digonnet et al., "Analysis of a Tunable Single Mode Optical Fiber Coupler", *IEEE Journal of Quantum Electronics*, vol. QE-18, No. 4, Apr. 1982, pp. 746-754.

Jackson et al., "Optical Fiber Delay-Line Signal Processing", *IEEE Transactions on Microwave Theory and Techniques*, vol. MTT-33, No. 3, Mar. 1985, pp. 193-210.

Tur et al., "Fiber-Optic Signal Processor with Applications to Matrix-Vector Multiplication and Lattice Filtering", *Optics Letters*, vol. 7, No. 9, Sep. 1982, pp. 463-465.

*Primary Examiner*—William L. Sikes
*Assistant Examiner*—Brian M. Healy
*Attorney, Agent, or Firm*—John H. Lynn

[57] ABSTRACT

The apparatus according to the invention is all-fiber optic device that produces an output indicative of the gradient of an acoustic wave in water. The device comprises a neutrally buoyant body having a relatively rigid outer case. When it is submerged in water, the motion of the case is the same as that of a water particle in the same vicinity. A fiber optic linear accelerometer produces a signal proportional to the component of acceleration.

20 Claims, 5 Drawing Sheets

FIBER OPTIC GRADIENT HYDROPHONE AND METHOD OF USING SAME

BACKGROUND OF THE INVENTION

This invention relates generally to apparatus and methods for sensing changes in physical phenomena. More particularly this invention relates to apparatus and methods for sensing changes in acoustic fields. Still more particularly, this invention relates to fiber optic apparatus and methods for sensing changes in acoustic fields.

A gradient hydrophone produces an output that is directly proportional to the gradient of the acoustic pressure in water. Previous gradient and direction finding hydrophones are electro-mechanical and typically use sensors that include piezoelectric, electromagnetic, or capacitive transduction elements. Some of these devices are configured as neutrally buoyant bodies having piezoelectric accelerometers or moving coil, velocity-type pickups mounted within relatively rigid cases.

All previous gradient hydrophones are electro-mechanical devices and as such are subject to electromagnetic pickup, which causes noise. When several electro-mechanical hydrophones are used in arrays, electrical crosstalk and other sources of electrical noise, such as ground loops, frequently cause problems.

Piezoelectric devices have relatively high impedances and are subject to capacitive loading; thus preamplifiers must be installed as close as possible to the device to prevent sensitivity degradation. These preamplifiers require delivery of electrical power thereto, which further adds to the cost and complexity of such systems.

A typical electromechanical hydrophone system includes twisted pair cables or coaxial cables as output leads. These output leads limit the bandwidth of the hydrophone systems. In addition, the cables required for arrays of hydrophones are heavy, large in cross section and expensive. Furthermore, in applications of current interest, size and weight restrictions greatly limit the useable number of hydrophone elements and reduce the effectiveness of the systems.

An optical fiber comprises a central core and a surrounding cladding. The refractive index of the core is greater than that of the cladding. Light is guided by the core if it impinges upon the core-cladding interface at an angle less than the critical angle for total internal reflection.

A light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate withous severe attenuation. The waves having field components that propagate unattenuated are called normal modes. A single mode fiber will propagate only one spatial distribution of energy, that is, one normal mode, for light of a given frequency.

Optical fibers are sensitive to a large number of physical phenomena, such as acoustic waves and temperature fluctuations. An optical fiber exposed to such phenomena changes the amplitude, phase or polarization of light guided by the fiber. Optical fibers have been considered for use as sensing elements in devices such as microphones, hydrophones, magnetometers, accelerometers and electric current sensors.

Optical fiber elements configured as Mach-Zehnder, Michelson, Sagnac, and resonant ring interferometers have been used as sensors. Interferometers respond to the phenomenon being sensed by producing phase differences in interfering light waves. Detecting phase changes in the waves permits quantitative measurements to be made on the physical quantity being monitored.

A fiber optic Mach-Zehnder interferometer typically has a reference arm comprising a first length of optical fiber and a sensing arm comprising a second length of optical fiber. The sensing arm is exposed to the physical parameter to be measured, such as an acoustic wavefront, while the reference arm is isolated from changes in the parameter. When the Mach-Zehnder interferometer is used as an acoustic sensor, acoustic wavefronts change the optical length of the sensing arm as a function of the acoustic wave pressure amplitude. An optical coupler divides a light signal between the two arms. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

SUMMARY OF THE INVENTION

The apparatus according to the invention is an all-fiber optic device that produces an output that is directly proportional to the gradient of the acoustic pressure in water. The device comprises a neutrally buoyant body having a relatively rigid outer case. When it is submerged in water, the motion of the case is the same as that of a water particle in the same vicinity. A fiber optic liner accelerometer produces a signal proportional to the component of acceleration along the axis of the accelerometer. By fitting the case with two or possibly three such accelerometers, aligned along mutually perpendicular axes, plus an omnidirectional fiber optic hydrophone and a gimballed compass, the present invention may be used to determine the direction of incidence of acoustic waves so that their source may be localized.

The fiber optic gradient hydrophone according to the present invention has the advantage of being all optical in its transduction mode and of having optical fibers as input and output leads. The present invention can be operated at great distance from the required optical source, detector and signal processing devices. Its fiber input and output leads are insensitive to electromagnetic pickup and have low loss. The hydrophone according to the present invention may be formed to have extremely high sensitivity, and is not subject to electromagnetic interference. The input and output fiber leads can be of very small diameter and light in weight. The fiber leads are directly compatible with the rapidly developing fiber optic communication and data transmission technologies.

Basically, the device comprises a fiber optic accelerometer mounted within a pressure tolerant, effectively rigid case to form a neutrally buoyant body. Since the outer case is pressure tolerant the fiber transduction elements and fiber-to-fiber couplers employed in the sensing portion of the device do not have to withstand high pressures or other environmentally severe conditions. A fiber optic accelerometer suitable for use in implementations of the invention is described in U.S. Pat. No. 4,671,113, issued June 9, 1987 to E. F. Carome as sole inventor.

A fiber optic gradient hydrophone according to the present invention for measuring acoustic pressure gradients in a fluid such as water comprises a body configured to be neutrally buoyant in the fluid, an accelerometer comprising a fiber optic interferometer having a first light path and a second light path in the neutrally buoyant body, means for introducing optical signals into the first and second light paths and means for producing in the optical signals a phase change indicative of acoustic pressure gradients on the neutrally buoyant body. The fiber optic interferometer is preferably either a Mach-Zehnder interferometer or a Michelson interferometer.

The means for introducing optical signals into the first and second light paths in the fiber optic gradient hydrophone according to the present invention preferably includes a coherent light source arranged to provide an accelerometer, consisting of a light signal to a first optical fiber that defines the first light path, and fiber optic directional coupling means that couples light from the first optical fiber to the second optical fiber that defines the second light path.

The first and second light paths in the fiber optic gradient hydrophone according to the present invention may comprise a first mandrel mounted to the inside of the case, a length of the first optical fiber formed in a first coil around the first mandrel, a second mandrel mounted to the inside of the case and spaced apart from the first mandrel, and a length of the second optical fiber formed in a second coil around the second mandrel.

The first and second fiber coils are preferably wound around the first and second mandrels, respectively, such that when the case is accelerated, the first and second optical fibers are subjected to oppositely directed tensile stresses that produce a differential change in the optical path length of the first and second optical fibers, respectively.

The neutrally buoyant body in the fiber optic gradient hydrophone according to the present invention may comprise a vessel having a cavity therein and wherein the first and second mandrels are mounted to the vessel inside the cavity at opposite ends of the cavity and separated by a fluid that is confined to the cavity. Alternatively, the neutrally buoyant body may comprise a vessel having a cavity therein with the first and second mandrels being mounted to the vessel inside the cavity at opposite ends of the cavity, and a mass mounted between the first and second mandrels such that acceleration of the mass causes oppositely directed forces to be exerted on the first and second mandrels. The mass preferably is mounted such that there are identical forces exerted on the first and second mandrels when the neutrally buoyant body is subjected to an acoustic pressure gradient orthogonal to a line between the first and second mandrels.

The fiber optic gradient hydrophone according to the present invention may also further comprise a vessel having a cavity therein, a first mandrel mounted to the vessel inside the cavity, a second mandrel mounted to the vessel inside the cavity, the first and second mandrels each being formed to have a fluid-filled cavity therein, a conduit positioned between the first and second mandrels such that the cavities in the first and second mandrels are in fluid communications with each other such that acceleration of the vessel along a line between the first and second mandrels causes a fluid pressure differential between the mandrels, the fluid pressure differential causing a change in the optical path length difference of the first and second second optical paths.

The method according to the present invention for measuring acoustic pressure gradients in a fluid such as water, comprising the steps of forming a body to be neutrally buoyant in the fluid, placing a fiber optic interferometer having a first light path and a second light path in the neutrally buoyant body, introducing optical signals into the first and second light paths, and producing in the optical signals a phase change indicative of acoustic pressure gradients on the neutrally buoyant body.

The step of introducing optical signals into the first and second light paths may include the steps of arranging a coherent light source to provide a light signal to a first optical fiber that defines the first light path and coupling light from the first optical fiber to the second optical fiber that defines the second light path.

The method according to the present invention may further comprise the steps of mounting a first mandrel to the neutrally buoyant body, forming a length of the first optical fiber in a first coil around the first mandrel, mounting a second mandrel to the neutrally buoyant body and spaced apart from the first mandrel, and forming a length of the second optical fiber in a second coil around the second mandrel.

The method may further include the steps of winding the first and second fiber coils around the first and second mandrels, respectively, such that the first and second optical fibers are each subjected to a tensile stress so that compressing the first mandrel and expanding the second mandrel produces a differential change in the optical path length of the first and second optical fibers, respectively. The method may additionally include the steps of forming a vessel with a cavity therein, and mounting the first and second mandrels to the vessel inside the cavity at opposite ends of the cavity and separating the mandrels by a fluid that is confined to the cavity.

The method according to the present invention may include the steps of forming a vessel with a cavity therein, mounting the first and second mandrels to the vessel inside the cavity at opposite ends of the cavity, and mounting a mass between the first and second mandrels such that acceleration of the vessel causes the mass to exert oppositely directed forces on the first and second mandrels.

The method according to the present invention may also include the step of mounting the mass such that there are identical compressive forces exerted on the first and second mandrels when the neutrally buoyant body is subjected to an acoustic pressure gradient orthogonal to a line between the first and second mandrels. The method may further comprise the steps of forming a vessel with a cavity therein, mounting a first mandrel to the vessel inside the cavity, mounting a second mandrel to the vessel inside the cavity, forming the first and second mandrels to each have a fluid-filled cavity therein, and placing the cavities in the first and second mandrels in fluid communication with each other such that acceleration of the vessel along a line between the first and second mandrels causes a fluid pressure differential between the mandrels, the fluid pressure differential causing a change in the optical path length difference of the first and second second optical paths.

DESCRIPTION OF THE PREFERRED EMBODIMENT

Figure 1:
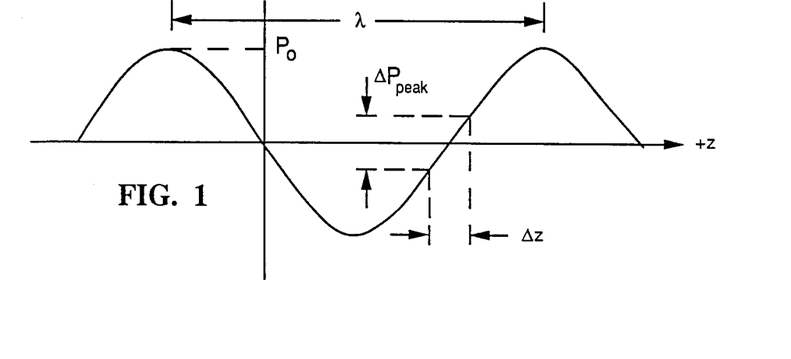
FIGS. 1 and 1A graphically illustrate pressure variations associated with an acoustic wave in water.

Referring to FIG. 1, consider a plane acoustic wave of angular frequency $\omega$ propagating in water in the $+z$ direction. The acoustic pressure at any point is a scalar quantity that may be expressed as $$p(z) = p_o \sin(\omega - Kz), \quad (1)$$

where $K = 2\pi/\lambda$ and $\lambda$ is the acoustic wavelength. The gradient of the pressure at any point is a vector quantity directed in the Z direction and its magnitude is given by $$\partial p/\partial z = -Kp_o \cos(\omega t - Kz) \quad (2)$$

FIG. 1 graphically illustrates the pressure as a function of position, z, at time $t=0$. The pressure gradient at any point is proportional to the pressure difference $\Delta p$ existing between two points spaced apart by a small fixed distance $\Delta z$. The peak value of the pressure difference $\Delta p$ may be seen to occur wherever $p=0$, and its peak value $(\Delta p)_{peak}$ is given by $$(\Delta p)_{peak} = Kp_o \Delta z = 2\pi/\lambda (p_o \Delta z). \quad (3)$$

At 50 Hz, for example, with $\lambda = 30$ m in water, and for $\Delta z = 10$ cm, $(\Delta p)_{peak} = 2.1 \times 10^{-2} p_o$, i.e. for a 50 Hz plane wave in water the peak pressure difference between two points 10 cm apart is approximately 1/50 of the peak pressure itself. Similarly, again for two points 10 cm apart, at 5 Hz $(\Delta p)_{peak}$ is about $p_o/500$ while at 500 Hz, $(\Delta p)_{peak}$ is about $p_o/5$.

Figure 1A:
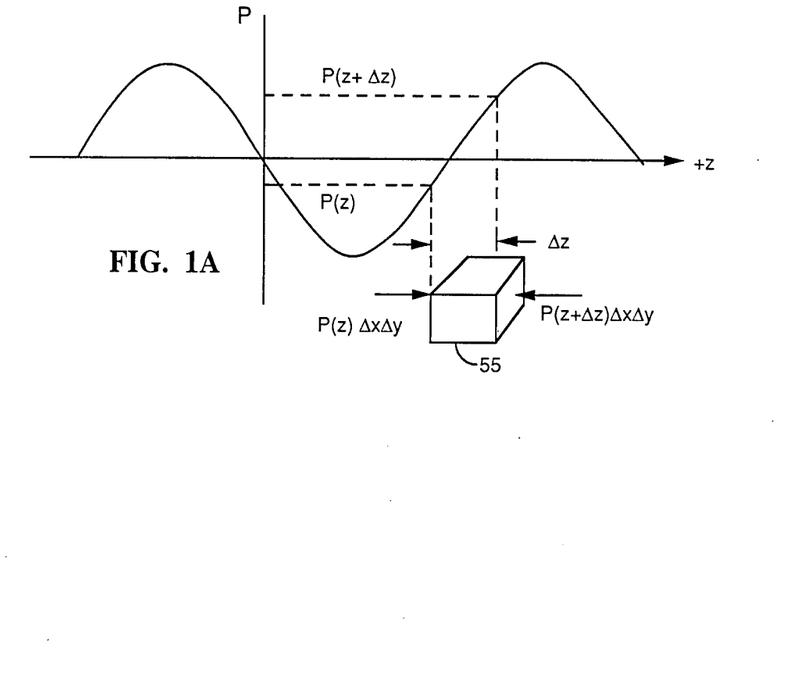

Next consider a small volume element or particle of water, of volume $V = \Delta z \Delta x \Delta y$, as shown in FIG. 1A. Here $\Delta x \Delta y$ is the area of the face perpendicular to the Z axis. The force exerted on this element of area $\Delta x \Delta y$ by an acoustic wave travelling in the Z direction is $$[p(z) - p(z + \Delta z)]\Delta x \Delta y = \Delta p \Delta x \Delta y. \quad (4)$$

This force will accelerate the element. For a 50 Hz sound wave of peak pressure 65 dB referred to 1 $\mu$Pa, (i.e., the sea state zero level at 50 Hz) the peak acceleration will be 0.04 $\mu$g where g is the acceleration of gravity.

Therefore, a particle of water is accelerated by the pressure difference acting on it. This pressure difference is due to the pressure gradient produced by the sound wave in the water. In general, then, since both the gradient of pressure and the particle acceleration are vectors directed in the direction of propagation of the sound wave, by determining the components of water particle acceleration along any two mutually perpendicular axes in a horizontal plane, the horizontal direction of propagation of the wave may be determined.

The direction of the sound wave may be determined as follows. Referring to FIG. 1A, consider a neutrally buoyant body 52 submerged in water. Assume that the dimensions of the neutrally buoyant body are much smaller than the wavelength of sound in the frequency range of interest. Since the body is neutrally buoyant, i.e., of the same mean density as water, then to a good approximation the neutrally buoyant body moves as a water particle and has the same acceleration as would a water particle in the same location. If the neutrally buoyant body includes a pair of linear accelerometers having sensing axes aligned along mutually perpendicular axes that lie in a horizontal plane, then the horizontal direction of the acceleration associated with a sound wave can be determined.

Figure 4:
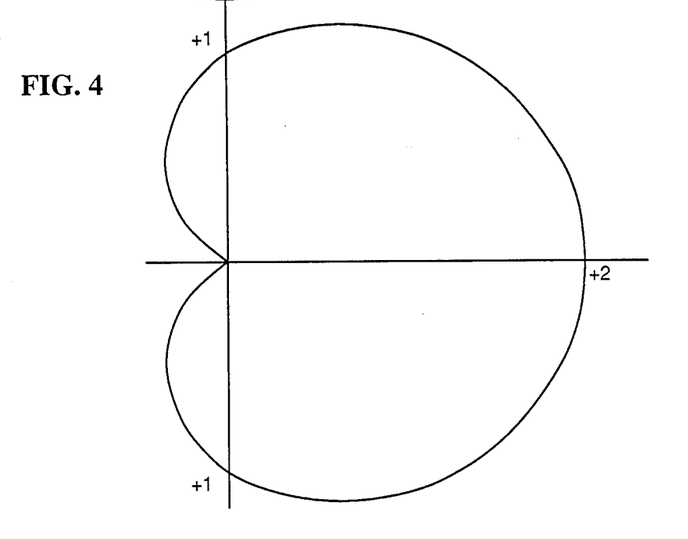

It should be pointed out that acoustic waves in water usually are cyclic and do not have a sharp beginning of a particular polarity. Therefore, only the orientation of the line of incidence can be determined from such acceleration measurements. There is an ambiguity as to whether the sound waves are coming in from the left or from the right along the line of incidence. This ambiguity can be removed by measuring the acoustic pressure simultaneously with measurements of the pressure gradient. Specifically, the output of a gradient type hydrophone is combined with that of an omnidirectional type hydrophone, taking care to properly adjust their relative phases and amplitudes at any given frequency. In this way the figure-eight response pattern of FIG. 2, which is characteristic of the output signal from a pressure gradient sensor may be converted into a cardioid type response pattern as shown in FIG. 4. Thus, but rotating the gradient hydrophone, the direction of maximum output can be determined, which yields the direction of incidence of the sound wave.

Figure 5:
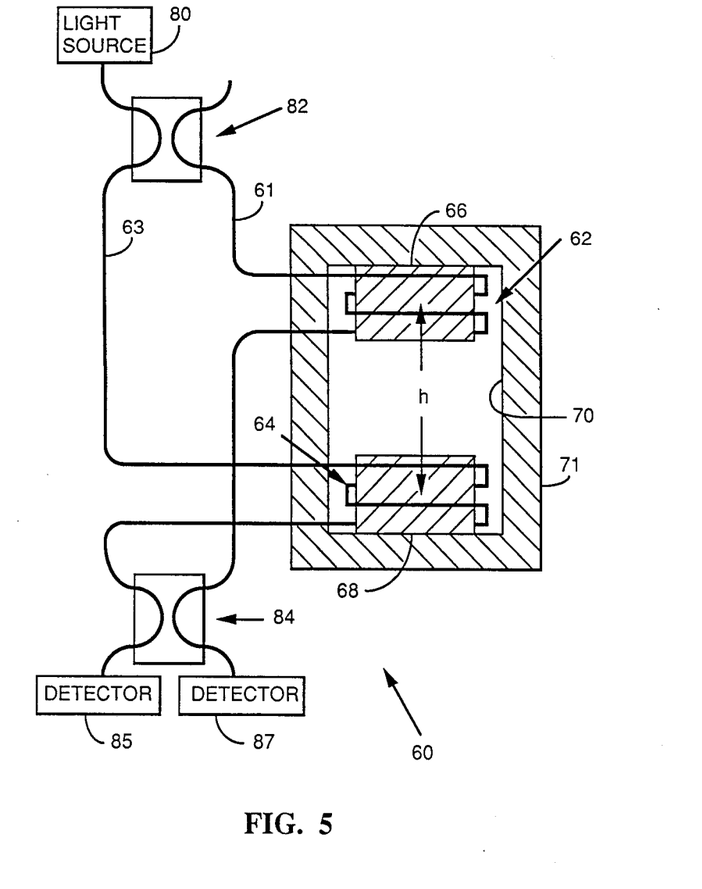
FIG. 5 schematically illustrates a fiber optic accelerometer that may be included in a fiber optic hydrophone according to the present invention.

A fiber optic linear accelerometer 60 can be formed as shown in FIG. 5. A pair of optical fibers 61 and 63 are formed into coils 62 and 64, respectively, that are mounted on mandrels 66 and 68, respectively at opposite ends of a fluid-filled cavity 70 in a vessel 71. A light source 80, which may be a laser diode, provides an input light beam to the fiber 63, which guides the input light to a fiber optic directional coupler 82, which is described in detail subsequently. The coupler 82 couples part of the light into the fiber 61. The coupler 82 preferably has a coupling efficiency of 50% so that half of the light intensity input to the fiber 63 is coupled into the fiber 61. The signals in the fibers 61 and 63 propagate from the coupler 82 to the coils 62 and 64, respectively. After passing through the coils 62 and 64, the light signals in the fibers 61 and 63 then impinge upon a second fiber optic directional coupler 84. The coupler 84 may be formed to be substantially identical to the coupler 82. The coupler 84 couples part of the light in the fiber 61 back into the fiber 63 and couples a second portion of the light in the fiber 63 into the fiber 61.

The fibers 61 and 63 and the couplers 82 and 84 comprise a Mach-Zehnder interferometer. The lengths of the fiber 61 and the fiber 63 between the couplers 82 and 84 comprise a pair of sensing arms 65 and 67, respectively.

The optical signals in the fibers 61 and 63 have a definite phase relationship just after the coupler 82 couples part of the light from the fiber 63 into the fiber 61. If the optical paths in the fibers 61 and 63 between the couplers 82 and 84 are not identical, then there will be a phase difference between the waves when they recombine in the coupler 84. The amount of the phase difference is indicative of the pathlength mismatch. The speed of light in an optical fiber is $v = c/n$ where c is the free space speed of light and n is the refractive index of the fiber; therefore, the time required to traverse the length $L_1$ between the couplers 82 and 84 in the fiber 61 is $t_1 = L_1/v_1 = L_1 n_1/c$. Similarly, the transit time for an optical signal in the fiber 63 between the couplers 82 and 84 is $t_2 = L_2/v_2 = L_2 n_2/c$, where $L_2$ is the length of the fiber 63 between the couplers. Differences in both the lengths $L_1$ and $L_2$ and the refractive indices $n_1$ and $n_2$ may cause phase differences. Therefore, there are two possible sources of a phase difference between the waves in the two fibers 61 and 63.

The result of combining the reference and sensing signals is the formation of interference between the two optical signals. This interference is a function of the phase difference $\theta$ between the optical signals and is the output of the Mach-Zehnder interferometer that is supplied to detectors 85 and 87. Changes in the interference effects indicate changes in the phase difference of the waves. These phase changes may be processed to determine the acoustic pressure gradient.

Effectively the fluid in the chamber 70 forms a mass that can exert inertial forces on the mandrels 66 and 68 when the vessel 71 is accelerated. If the fluid's mass density is $\rho_L$, then the mandrels 66 and 68 will be subjected to a compressive pressure difference of $\rho_L ah$, where a is the component of acceleration along a line between the mandrels 66 and 68 and h is the mean spacing between them.

For simplicity, assume that when $a = 0$ the equilibrium pressure in the chamber is compressive on both the mandrels 66 and 68. Then if a is vertically upward in FIG. 5, the mandrel 68 will be subjected to an increased compressive stress while the mandrel 66 will be subjected to a reduced compressive stress. The difference in compressive stresses on the upper and lower mandrels 66 and 68, respectively, will produce different stresses in the fibers 61 and 63. These stresses change the lengths $L_1$ and $L_2$ of the fibers 61 and 63, respectively, and may also change the refractive indices $n_1$ and $n_2$ by means of the elasto-optic effect. Both the differential changes in length and in refractive index produce a relative optical phase shift between the two optical beams that combine in the interferometer output coupler 84. If the direction of the acceleration a is reversed, the relative phase shift also reverses, since the two compressive stress changes reverse. A fiber optic gradient hydrophone may be produced by mounting an accelerometer such as the accelerometer 60 within a neutrally buoyant body.

Figure 6:
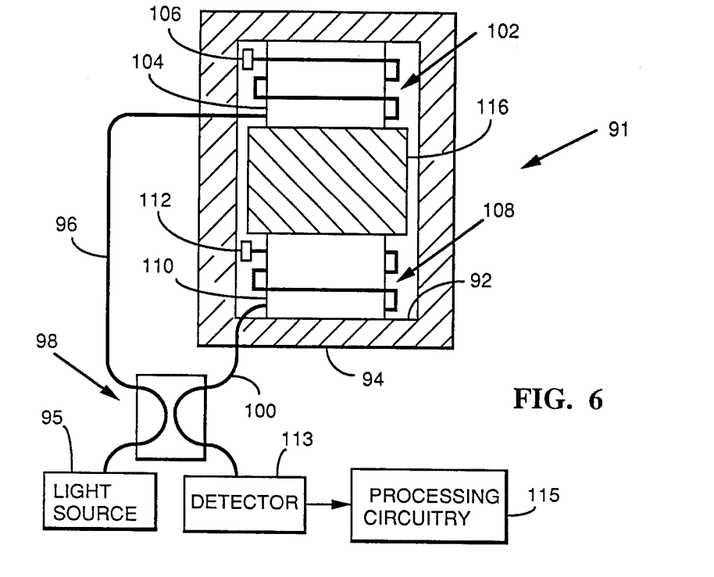
FIG. 6 schematically illustrates second embodiment of a fiber optic accelerometer that may be included in a fiber optic hydrophone according to the present invention.

A second embodiment of a fiber optic accelerometer is shown in FIG. 6. An accelerometer 91 includes a Michelson interferometer mounted in a cavity 92 in a rigid case 94. The Michelson interferometer includes a light source 95 that provides optical signals to an optical fiber 96. A fiber optic directional coupler 98 couples part of the light from the fiber 96 into a fiber 100. The fiber 96 is formed to include a coil 102 wound around a mandrel 104, and the fiber is then terminated in a mirror 106. The fiber 100 includes a coil 108 that is wound around a mandrel 110 before being terminated in a mirror 112. The mirror 106 reflects signals input to the fiber 96 back through the coil 102 and thence to the coupler 98. Similarly, the mirror 112 reflects signals in the fiber 100 back through the coil 108 and to the coupler 98.

The light waves in the fibers have a definite phase relationship when they exit the coupler 98. The light in the fiber 96 travels though the coil 102, reflects from the mirror 106 and travels through the coil 102 again before reaching the coupler 98. The light in the fiber 100 travels though the coil 108, reflects from the mirror 112 and travels through the coil 108 again before reaching the coupler 98. The phase relationship between the waves may change in the time between when the waves leave the coupler 98 and return back to it.

An isolated mass 116, rather than a fluid element, is mounted between the two mandrels 104 and 110. Effectively, the two mandrels 104 and 110 act as elastic elements, i.e., springs, whose compressions are changed under the action of the inertial forces exerted on them by the mass element 116. Thus, there will be similar chages in the tensile stresses exerted on the mandrels 104 and 110, such as those of the compressive stresses mentioned above with reference to the mandrels 64 and 68. As also described above, the indicated optical phase shifts reverse when the pressure gradient and the acceleration reverse.

Figure 7:
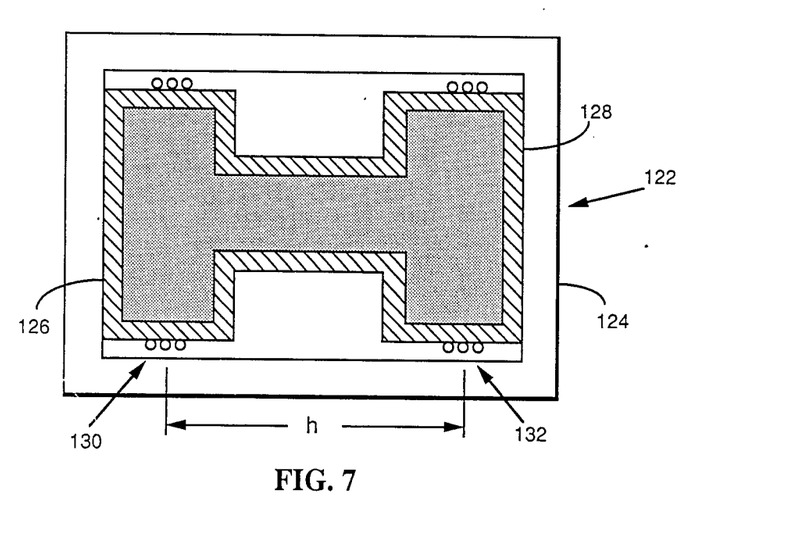
FIG. 7 schematically illustrates a third embodiment of a fiber optic accelerometer that may be included in a fiber optic hydrophone according to the present invention.

A third type of accelerometer and gradient type hydrophone 120 are shown in FIG. 7. A neutrally buoyant body 122 comprises a rigid outer case 124 that is filled with air or other similar gas. Mounted within this air filled case 124 are a pair of interconnected hollow mandrels 126 and 128 filled with a liquid or other suitable fluid of density $\rho_l$. A pair of fiber optic coils 130 and 132 are wound on the outside of the mandrels 126 and 128, respectively. These fiber optic coils 130 and 132 form the arms of an optical interferometer, which may be either a Mach-Zehnder or a Michelson interferometer as described above with reference to FIGS. 5 and 6. When the case 124 is accelerated to the right, the left mandrel 126 expands while the right mandrel 128 contracts due to the $\rho_L ah$ pressure difference generated between them. This pressure difference produces a relative optical phase shift in signals propagating in the coils 130 and 132 proportional to the pressure gradient.

Figure 2:
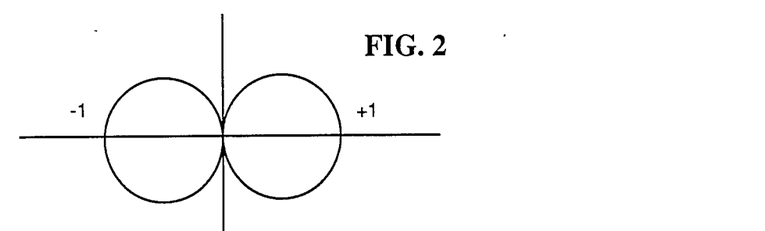
FIGS. 2–4 illustrate hydrophone response patterns.
Figure 3:
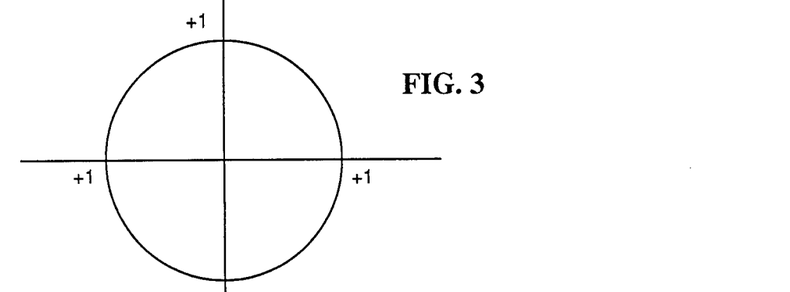

For plane waves incident on a gradient hydrophone, the response pattern is a "figure-eight," as depicted in FIG. 2. The output is directly proportional to $\cos\theta$ where θ is the angle between the direction of incidence and the axis of maximum response of the hydrophone. The bidirectional ambiguity of the figure-eight pattern is removed by combining the output of the gradient hydrophone with that from an omnidirectional hydrophone, resulting in a cardiod response pattern, as indicated in FIG. 4. An omnidirectional hydrophone (not shown) has a response pattern as shown in FIG. 3.

With the addition of a compass, it is possible to determine the horizontal azimuth of a detected target. An array of such transducer combinations can provide three dimensional directivity. Using highly sensitive omnidirectional hydrophones to make the initial target contact and acoustic signature determination, it is possible to employ enhanced signal processing techniques in the target angular localization process to overcome the inherent reduced sensitivity of the pressure gradient hydrophones.

A fiber optic direction coupler suitable for use in single mode fiber implementations of the invention is described in the Mar. 29, 1980 issue of *Electronics Letters*, Vol. 18, No. 18. pp. 260–261 and in U.S. Pat. No. 4,493,518 issued Jan. 15, 1985 to Shaw et al. That patent is assigned to the Board of Trustees of the Leland Stanford Junior University.

Figure 8:
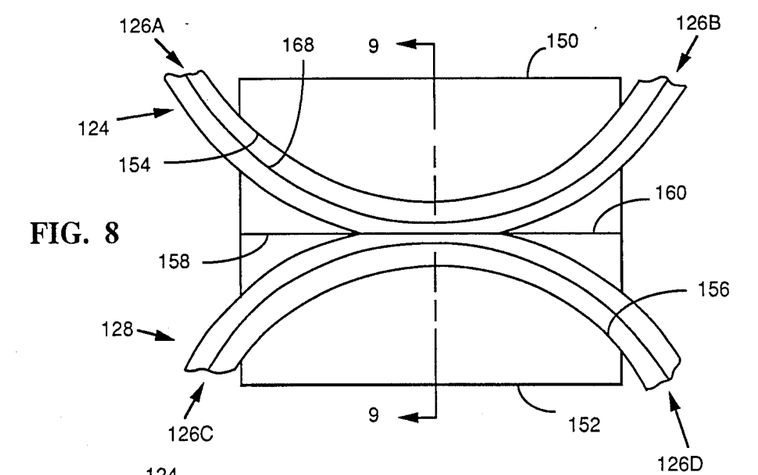
FIG. 8 is a cross sectional view of a fiber optic directional coupler that may be included in a fiber optic hydrophone according to the present invention.
Figures 9, 10:
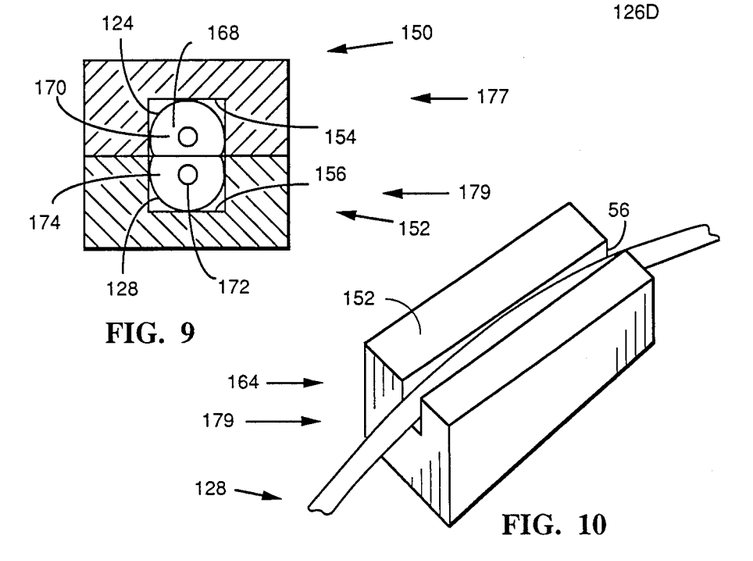
FIG. 9 is a cross sectional view taken along line 9—9 of FIG. 8.
FIG. 10 is a perspective view of a coupler half that may be included in a fiber optic hydrophone according to the present invention

Referring to FIGS. 8–10, optical power can be coupled between two optical fibers 124 and 128 by the evanescent fields that extend outside the fibers. This effect has been used to make integrated-optic couplers where the dielectric waveguides can be fabricated in close enough proximity for evanescent coupling. The fiber 124 has a core 168 and a cladding 170, and the fiber 128 has a core 172 and a cladding 174. With optical fibers the evanescent field is buried deep within the fiber cladding to achieve low loss. Therefore, some claddings 170 and 174 must be removed to expose the evanescent field of the guiding fiber cores 168 and 172, respectively. The couplers used in the present invention may be formed by using a mechanical lapping technique to expose the evanescent fields.

Referring to FIGS. 8 and 9, the optical fiber 124 is bonded into a curved slot 154 in a quartz block 150. The block 150 and fiber cladding 170 are then ground and polished to within a few microns of the fiber core 168. The polished block 150 and fiber 124 comprise a coupler half 177, and a polished block 152 and the fiber 124 comprise a coupler half 179. Placing the two coupler halves 177 and 179 in contact so that the polished faces confront each other places the cores 168 and 172 in close proximity. An index-matching oil is then inserted by capillary action between the polished coupler halves 177 and 179 to match the cladding index to the refractive index of the block. This oil also acts as a lubricant to allow one coupler half to be slid over the other to change the core-to-core separation and the net coupling.

Referring to FIG. 8, consider light traveling from ports 126A and 126C interacting in the coupling region, and exiting from ports 126B and 126D. The input electric fields in fibers 124 and 128 can be expressed as $$E_i(x,y,z,t) = \tfrac{1}{2} E_i(z) a(x,y) e^{j(\beta z - \omega t)} + \text{c.c.}, \quad i = 1, 2 \tag{5}$$

where $E_i(z)$ is the complex field amplitude, ω is the optical frequency, β is the fiber propagation constant, and c.c. is the complex conjugate. E(z) changes with z only in the coupling region. The vector a(x,z) is the modal field distribution normalized to unity:

$$\int_{-\infty}^{+\infty} a(x,y) a^*(x,y) dx dy = 1 \tag{6}$$

In general, for a single-mode fiber there are two possible orthogonal field distributions, a and b, representing two orthogonal states of polarization, where $$\int_{-\infty}^{+\infty} a(x,y) b^*(x,y) dx dy = 0 \tag{7}$$

This analysis always assumes that only one polarization mode is present and does not consider the field distribution any further. More generally, if the directional coupler is polarization independent, any well defined input state of polarization (expressed as a linear combination of a and b) can be thought of as a single "polarization mode." Again, the field distribution need not be considered.

When the fiber guides are evanescently coupled, the z dependence of the complex fields in the optical fibers 124 and 128 follows standard coupled-mode relations:

$$dE_1(z)/dz = jk E_2(z) \tag{8}$$

$$dE_2(z)/dz = jk E_1(z). \tag{9}$$

A constant coupling coefficient per unit length k is assumed. The two fiber guides are considered to be identical, and therefore have identical propagation constants β. If the coupling starts at z=0 with the initial amplitudes of $E_1(0)$ and $E_2(0)$ in fibers 124 and 128, respectively, then for a lossless coupler $$d/dz(|E_1(z)|^2 + |E_2(z)|^2) = 0. \tag{10}$$

Under these conditions the solutions to Equations (8) and (9) are $$E_1(z) = E_1(0) \cos kz + j E_2(0) \sin kz \tag{11}$$

$$E_2(z) = j E_1(0) \sin kz + E_2(0) \cos kz. \tag{12}$$

In the directional coupler described above, the coupling is not constant over the interaction region due to the curving of the fibers 124 and 128. The coupling coefficient is a function of z with a maximum value of $k_o$ where the fibers are closest. This coupler can be considered as having an effective coupling length $L_c$ with a constant coupling coefficient $k_o$ given by $$k_o L_c = \int_{-\infty}^{+\infty} k(z) dz \tag{13}$$

Therefore, after the coupled-mode interaction, the complex field amplitudes in the two fibers are $$E_1(L_c) = E_1(0) \cos k_o L_c + j E_2(0) \sin k_o L_c \tag{14}$$

$$E_2(L_c) = j E_1(0) \sin k_o L_c + E_2(0) \cos k_o L_c. \tag{15}$$

In many applications, the parameter of interest is the total coupled power. Let $\sin k_o L_c \equiv \kappa^{\frac{1}{2}}$ and thus $\cos k_o L_c = (1 - \kappa)^{\frac{1}{2}}$. Further, the amplitudes $E_1(0)$ and $E_2(0)$ can be regarded as the field amplitudes at two input ports, 126A and 126C while the amplitudes $E_1(L_c)$ and $E_2(L_c)$ can be the field amplitudes at the two output ports 126B and 126D. Defining $E_1 \equiv E_1(0)$, $E_2 \equiv E_2(0)$, $E_3 \equiv E_1(L_c)$, and $E_4 \equiv E_2(L_c)$, yields $$E_3 = (1-\kappa)^{\frac{1}{2}} E_1 + j\kappa^{\frac{1}{2}} E_2 \quad (16)$$

$$E_4 = j\kappa^{\frac{1}{2}} E_1 + (1-\kappa)^{\frac{1}{2}} E_2. \quad (17)$$

Consider the case where $E_2 = 0$, so that light is incident only in fiber 124. Equations (16) and (17) reduce to $$E_3 = (1-k)^{\frac{1}{2}} E_1 \quad (18)$$

$$E_4 = jk^{\frac{1}{2}} E_1. \quad (19)$$

When $\kappa = 0$, no coupling occurs between the two fibers. With $\kappa = 0.5$, $|E_3|^2 = |E_4|^2$ and half the power has been coupled from the fiber 124 into the fiber 128. When $\kappa = 1$, $E_3 = 0$ and $|E_4|^2 = |E_1|^2$ and all the power has been coupled. Therefore, $\kappa$ is the intensity coupling constant.

For the case described by Equations (18) and (19), the phase of the light in port 126D is greater than in port 126B by $\pi/2$ as indicated by the j factor in the expression for $E_4$. The complete output fields are defined as $E_3$ and $E_4$, as in Equation (5). If $E_3$ has a phase term of $e^{j(\beta z - \omega t)}$, then $E_4$ has a phase term of $e^{j(\beta z - \omega t + \pi/2)} = e^{j(\beta z - \omega[t - \pi/(2\omega)])}$. Thus $E_4$ lags $E_3$ in time. Physically, the coupling of power from fiber 124 to fiber 128 occurs because the evanescent electric field in fiber 124 induces a linear polarization in fiber 128 at the optical frequency in phase with the evanescent electric field of fiber 124. The linear polarization in fiber 128 is the driving term in Maxwell's equations and generates an electromagnetic wave in fiber 128 that lags this polarization in time. The driving polarization and driven field in fiber 124 have the proper phase relationship for power exchange from the induced polarization to the field.

The $e^{j(\beta z - \omega t)}$ convention of Equation (5) is chosen so that an increasing fiber length produces an increasing phase and a delay in time. If the convention was chosen to be $e^{j(\omega t - \beta z)}$, the coupling equation (16) would be modified by replacing $j$ by $-j$. Then, in Equations (17) and (19), $E_4$ would have a phase less than $E_3$ by $\pi/2$ rad, and the phase term could be written as $e^{j(\omega t - \beta z - \pi/2)} = e^{j(\omega[t - /2\omega] - \beta z)}$. Again, $E_4$ lags $E_3$ in time, which is consistent with the physical model of a driven polarization producing a powder transfer.

A detailed theoretical and experimental study of this type of coupler was carried out by M. J. F. Digonnet and H. J. Shaw, "Analysis of a Tunable Single-Mode Fiber-Optic Coupler", IEEE J. Quantum Electron., QE-18, 1746, (1982). In particular, the intensity coupling constant $\kappa$ was theoretically determined by the coupler geometry and the adjustable core-to-core separation. Since the directional coupler is a true coupler-mode system formed of two identical waveguides, 100% power transfer from one fiber to the other can be achieved.

Other types of optical couplers such as tapered biconical couplers may also be used to fabricate a hydrophone device according to the invention.

What is claimed is:

1. A fiber optic gradient hydrophone for measuring acoustic pressure gradients in a fluid such as water, comprising:
    a body configured to be neutrally buoyant in the fluid;
    a fiber optic interferometer having a first light path and a second light path in the neutrally buoyant body;
    means for introducing optical signals into the first and second light paths; and
    means for producing in the optical signals a phase change indicative of acoustic pressure gradients on the neutrally buoyant body.

2. The fiber optic gradient hydrophone according to claim 1, wherein the means for introducing optical signals into the first and second light paths includes:
    a coherent light source arranged to provide a light signal to a first optical fiber that defines the first light path; and
    fiber optic directional coupling means that couples light from the first optical fiber to the second optical fiber that defines the second light path.

3. The fiber optic gradient hydrophone of claim 2 wherein the first and second light paths comprise:
    a first mandrel mounted to the neutrally buoyant body;
    a length of the first optical fiber formed in a first coil around the first mandrel;
    a second mandrel mounted to the neutrally buoyant body and spaced apart from the first mandrel; and
    a length of the second optical fiber formed in a second coil around the second mandrel.

4. The fiber optic gradient hydrophone of claim 3 wherein the first and second cells are wound around the first and second mandrels, respectively, such that the first and second optical fibers are each subjected to a tensile stress so that compression of the first mandrel and expansion of the second mandrel produces a differential change in the optical path length of the first and second optical fibers, respectively.

5. The fiber optic gradient hydrophone of claim 3 wherein the neutrally buoyant body includes a vessel having a cavity therein and wherein the first and second mandrels are mounted to the vessel inside the cavity at opposite ends of the cavity and separated by a fluid that is confined to the cavity.

6. The fiber optic gradient hydrophone of claim 3 wherein the neutrally buoyant body includes a vessel having a cavity therein, the first and second mandrels are mounted to the vessel inside the cavity at opposite ends of the cavity; and a mass is mounted between the first and second mandrels such that acceleration of the neutrally buoyant body causes oppositely directed forces to be exerted the first and second mandrels.

7. The fiber optic gradient hydrophone of claim 6 wherein the mass is mounted such that there are identical forces on the first and second mandrels when the neutrally buoyant body is subjected to an acoustic pressure gradient orthogonal to a line between the first and second mandrels.

8. The fiber optic gradient hydrophone of claim 3 further comprising:
    a vessel having a cavity therein;
    a first mandrel mounted to the vessel inside the cavity;
    a second mandrel mounted to the vessel inside the cavity, the first and second mandrels each being formed to have a fluid-filled cavity therein;
    a conduit positioned between the first and second mandrels such that the cavities in the first and second mandrels are in fluid communication with each other such that acceleration of the vessel along a line between the first and second mandrels causes a fluid pressure differential between the mandrels, the fluid pressure differential causing a change in the optical path length difference of the first and second second optical paths.

9. The fiber optic gradient hydrophone of claim 1 wherein the fiber optic interferometer is a Mach-Zehnder interferometer.

10. The fiber optic gradient hydrophone of claim 1 wherein the fiber optic interferometer is a Michelson interferometer.

11. A method for measuring acoustic pressure gradients in a fluid such as water, comprising the steps of:
forming a body to be neutrally buoyant in the fluid;
placing a fiber optic interferometer having a first light path and a second light path in the neutrally buoyant body;
introducing optical signals into the first and second light paths; and
producing in the optical signals a phase change indicative of acoustic pressure gradients on the neutrally buoyant body.

12. The method according to claim 11, wherein the step of introducing optical signals into the first and second light paths includes the steps of:
arranging a coherent light source to provide a light signal to a first optical fiber that defines the first light path; and
coupling light from the first optical fiber to the second optical fiber that defines the second light path.

13. The method of claim 12 further comprising the steps of:
mounting a first mandrel to the neutrally buoyant body;
forming a length of the first optical fiber in a first coil around the first mandrel;
mounting a second mandrel to the neutrally buoyant body and spacing it apart from the first mandrel; and
forming a length of the second optical fiber in a second coil around the second mandrel.

14. The method of claim 13 including the steps of winding the first and second coils around the first and second mandrels, respectively, such that the first and second optical fibers are each subjected to a tensile stress so that compressing the first mandrel and expanding the second mandrel produces a differential change in the optical path length of the first and second optical fibers, respectively.

15. The method of claim 13 including the steps of:
forming a vessel with a cavity therein; and
mounting the first and second mandrels to the vessel inside the cavity at opposite ends of the cavity and separating them by a fluid that is confined to the cavity.

16. The method of claim 13 including the step of:
forming a vessel with a cavity therein; and
mounting the first and second mandrels to the vessel inside the cavity at opposite ends of the cavity; and
mounting a mass between the first and second mandrels such that acceleration of the vessel causes the mass to exert a compressive force on the first mandrel and an expansive force on the second mandrel.

17. The method of claim 16 including the step of mounting the mass mounted such that there are identical forces on the first and second mandrels when the neutrally buoyant body is not subjected to an acoustic pressure gradient having a component directed along a line between the first and second mandrels.

18. The method of claim 13 further comprising the steps of:
forming a vessel with a cavity therein;
mounting a first mandrel to the vessel inside the cavity;
mounting a second mandrel to the vessel inside the cavity;
forming the first and second mandrels to each have a fluid-filled cavity therein;
placing the cavities in the first and second mandrels in fluid communication with each other such that acceleration of the vessel along a line between the first and second mandrels causes a fluid pressure differential between the mandrels, the fluid pressure differential causing a change in the optical path length difference of the first and second second optical paths.

19. The method of claim 11 including the step off forming the fiber optic interferometer to be a Mach-Zehnder interferometer.

20. The method of claim 11 including the step off forming the fiber optic interferometer to a Michelson interferometer.

* * * * *